US011423786B2

(12) United States Patent
Shao et al.

(10) Patent No.: US 11,423,786 B2
(45) Date of Patent: Aug. 23, 2022

(54) MANAGEMENT DEVICE, FLIGHT MANAGEMENT SYSTEM, FLIGHT MANAGEMENT METHOD AND PROGRAM

(71) Applicant: KDDI Corporation, Tokyo (JP)

(72) Inventors: Xiao Shao, Tokyo (JP); Hiroki Takeda, Tokyo (JP); Shingo Watanabe, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 148 days.

(21) Appl. No.: 16/645,582

(22) PCT Filed: Mar. 12, 2018

(86) PCT No.: PCT/JP2018/009441
§ 371 (c)(1),
(2) Date: Mar. 9, 2020

(87) PCT Pub. No.: WO2019/058598
PCT Pub. Date: Mar. 28, 2019

(65) Prior Publication Data
US 2020/0219402 A1 Jul. 9, 2020

(30) Foreign Application Priority Data
Sep. 25, 2017 (JP) .............................. JP2017-183437

(51) Int. Cl.
*G08G 5/00* (2006.01)
*B64D 45/00* (2006.01)
*H04W 28/26* (2009.01)

(52) U.S. Cl.
CPC ........... *G08G 5/0013* (2013.01); *B64D 45/00* (2013.01); *G08G 5/003* (2013.01); *H04W 28/26* (2013.01)

(58) Field of Classification Search
CPC .... G08G 5/0013; G08G 5/003; G08G 5/0026; G08G 5/0069; G08G 5/0052;
(Continued)

(56) References Cited

U.S. PATENT DOCUMENTS

2016/0135132 A1* 5/2016 Donepudi ........... H04W 52/245
370/311
2016/0371985 A1 12/2016 Kotecha
(Continued)

FOREIGN PATENT DOCUMENTS

| JP | 2012-144250 A | 8/2012 |
| JP | 2016-053518 A | 4/2016 |

(Continued)

OTHER PUBLICATIONS

Office Action issued in corresponding Japanese Patent Application No. 2021-050784 dated May 11, 2021 with English translation.
(Continued)

*Primary Examiner* — James J Lee
*Assistant Examiner* — Shon G Foley
(74) *Attorney, Agent, or Firm* — Foley & Lardner LLP

(57) ABSTRACT

A management device is configured to acquire a flight-schedule time/date, a flight-start position, and a flight-end position with respect to a flight device, to determine a plurality of base stations based on the flight-start position and the flight-end position, to estimate allocatable radio resources, which are allocated to the flight device at the flight-schedule time/date by each of the base stations, according to the history information of the communication status of the base stations, to compare allocatable radio resources to the flight device with necessary radio resources scheduled to be used for a communication of the flight device, and to thereby set a flight route of the flight device over a cell of a base station which provides allocatable radio
(Continued)

resources to the flight device larger than necessary radio resources scheduled to be used for the communication of the flight device.

7 Claims, 5 Drawing Sheets

(58) Field of Classification Search
CPC .... B64D 45/00; H04W 28/26; H04W 72/048; H04W 24/02; G01C 21/00
See application file for complete search history.

(56) References Cited

U.S. PATENT DOCUMENTS

| | | |
|---|---|---|
| 2017/0168480 A1 | 6/2017 | Waenstedt |
| 2018/0338250 A1* | 11/2018 | Mishra ................ H04W 24/10 |
| 2021/0103294 A1* | 4/2021 | Mahkonen ........... G05D 1/0038 |

FOREIGN PATENT DOCUMENTS

| | | |
|---|---|---|
| JP | 2017-117018 A | 6/2017 |
| WO | WO-2016/094849 A1 | 6/2016 |
| WO | WO-2017/149451 A2 | 9/2017 |

OTHER PUBLICATIONS

International Search Report issued in corresponding PCT Application No. PCT/JP2018/009441 dated Jun. 12, 2018.

* cited by examiner

MANAGEMENT DEVICE, FLIGHT MANAGEMENT SYSTEM, FLIGHT MANAGEMENT METHOD AND PROGRAM

TECHNICAL FIELD

The present invention relates to a management device, a flight management system, a flight management method and a program, which are each configured to set a flight route of a flight device.

The present application claims the benefit of priority on Japanese Patent Application No. 2017-183437 filed on Sep. 25, 2017, the subject matter of which is hereby incorporated herein by reference.

BACKGROUND ART

Flight devices such as drones have been widely used and controlled to fly in the air according to control signals from servers (see Patent Document 1). In particular, flight devices have been used and controlled using mobile phone networks during their flights.

CITATION LIST

Patent Literature Document

Patent Document 1: Japanese Patent Application Publication No. 2017-117018

SUMMARY OF INVENTION

Technical Problem

This type of conventionally-known flight devices may suffer from a problem in that control signals may not reach flight devices due to deterioration of communication quality when base stations covering mobile phone networks has an excessive number of connections in flight areas of flight devices.

The present invention is made in consideration of the above problem, and therefore the present invention aims to provide a management device, a flight management system, a flight management method and a program, which can inhibit disconnection of communication with flight devices.

Solution to Problem

In a first aspect of the invention, a management device includes an acquisition part configured to acquire a flight-schedule time/date, a flight-start position, and a flight-end position of a flight device, a determination part configured to determine a plurality of base stations based on the flight-start position and the flight-end position, an estimation part configured to estimate allocatable radio resources, which are allocated to the flight device at the flight-schedule time/date by each of a plurality of base stations, according to the history information of the communication status of a plurality of base stations, a comparator configured to compare allocatable radio resources, which are allocated to the flight device by a plurality of base stations and estimated by the estimation part, with necessary radio resources scheduled to be used for a communication of the flight device, and a route-setting part configured to set a flight route of the flight device over a cell covered by a base station which provides allocatable radio resources to the flight device larger than necessary radio resources scheduled to be used for the communication of the flight device.

The route-setting part may set the flight route of the flight device over the cell covered by the base station which provides allocatable radio resources to the flight device at a usable frequency band of the flight device among a plurality of frequency bands larger than necessary radio resources scheduled to be used for the communication of the flight device.

The acquisition part may acquire a flight-schedule count representing the number of other flight devices scheduled to concurrently fly in the cell covered by the base station, wherein the route-setting part may set the flight route over the cell covered by the base station ascribed to the flight-schedule count which does not reach an upper-limit count of concurrent flights.

The acquisition part may acquire an intensity of interference among a plurality of base stations, and therefore the management device may further include an adjustment part configured to adjust a direction of radio waves transmitted by an antenna of the base station when the intensity of interference acquired by the acquisition part in the cell of the base station attributed to the flight route of the flight device is higher than a threshold value.

The acquisition part may acquire an intensity of interference among a plurality of base stations, wherein the route-setting part may set the flight route over the cell covered b the base station causing the in of interference acquired by the acquisition part equal or less than the threshold value.

The acquisition part may acquire the communication status of a plurality of base stations and thereby acquire allocatable radio resources to the flight device with a plurality of base stations according to the communication status of a plurality of base stations, wherein the route-setting part may reset the flight route of the flight device over the cell covered by the base station which provides allocatable radio resources to the flight device according to the communication status of a plurality of base stations larger than necessary radio resources scheduled to be used for the communication of the flight device.

The estimation part may estimate allocatable radio resources, which respective one of the plurality of base stations allocate to the flight device at its flight-schedule time/date, based on an event to be held at the flight-schedule time/date or the history information of the communication status of a plurality of base stations at a previous time/date of implementing maintenance.

The acquisition part may acquire necessary radio resources scheduled to be used for the communication of the flight device from an external device, and therefore when the acquisition part acquires necessary radio resources scheduled to be used for the communication of the flight device, the route-setting part may set the flight route of the flight device over the cell covered by the base station providing allocatable radio resources to the flight device larger than necessary radio resources scheduled to be used for the communication of the flight device.

In a second aspect of the invention, a flight management system includes a first management device and a second management device. The first management device further includes an acquisition part configured to acquire a flight-schedule time/date, a flight-start position, and a flight-end position of a flight device, a determination part configured to determine a plurality of base stations based on the flight-start position and the flight-end position, an estimation part configured to estimate allocatable radio resources, which are allocated to the flight device at the flight-schedule time/date by each of a plurality of base stations, according to the history information of the communication status of a plurality of base stations, and a notification part configured to notify the second management device of allocatable radio resources, which are allocated to the flight device by a plurality of base stations and estimated by the estimation part. The second management device further includes a comparator configured to compare allocatable radio resources, which are allocated to the flight device by a plurality of base stations and notified by the notification part with necessary radio resources scheduled to be used for a communication of the flight device, and a route-setting part configured to set a flight route of the flight device over a cell covered by a base station which provides allocatable radio resources to the flight device larger than necessary radio resources scheduled to be used for the communication of the flight device.

In a third aspect of the invention, a flight management method includes the steps of acquiring a flight-schedule time/date, a flight-start position, and a flight-end position of a flight device; determining a plurality of base stations based on the flight-start position and the flight-end position; estimating allocatable radio resources, which are allocated to the flight device at the flight-schedule time/date by each of the plurality of base stations, according to the history information of the communication status of the plurality of base stations; comparing the estimated allocatable radio resources, which are allocated to the flight device by a plurality of base stations, with necessary radio resources scheduled to be used for a communication of the flight device; and setting a flight route of the flight device over a cell covered by a base stations which provides allocatable radio resources to the flight device larger than necessary radio resources scheduled to be used for the communication of the flight device.

In a fourth aspect of the invention, a program causes a computer to implement the steps of acquiring a flight-schedule time/date, a flight-start position, and a flight-end position of a flight device; determining a plurality of base stations based on the flight-start position and the flight-end position; estimating allocatable radio resources, which are allocated to the flight device at the flight-schedule time/date by each of a plurality of base stations, according to the history information of the communication status of a plurality of base stations; comparing the estimated allocatable radio resources, which are allocated to the flight device by a plurality of base stations, with necessary radio resources scheduled to be used for a communication of the flight device; and setting a flight route of the flight device over a cell covered by a base station which provides allocatable radio resources to the flight device larger than necessary radio resources scheduled to be used for the communication of the flight device.

Advantageous Effects of Invention

According to the present invention, it is possible to achieve an effect of inhibiting disconnection of communication conducted between base stations and flight devices.

DESCRIPTION OF EMBODIMENT

[Configuration of Flight Management System S]

Figure 1:
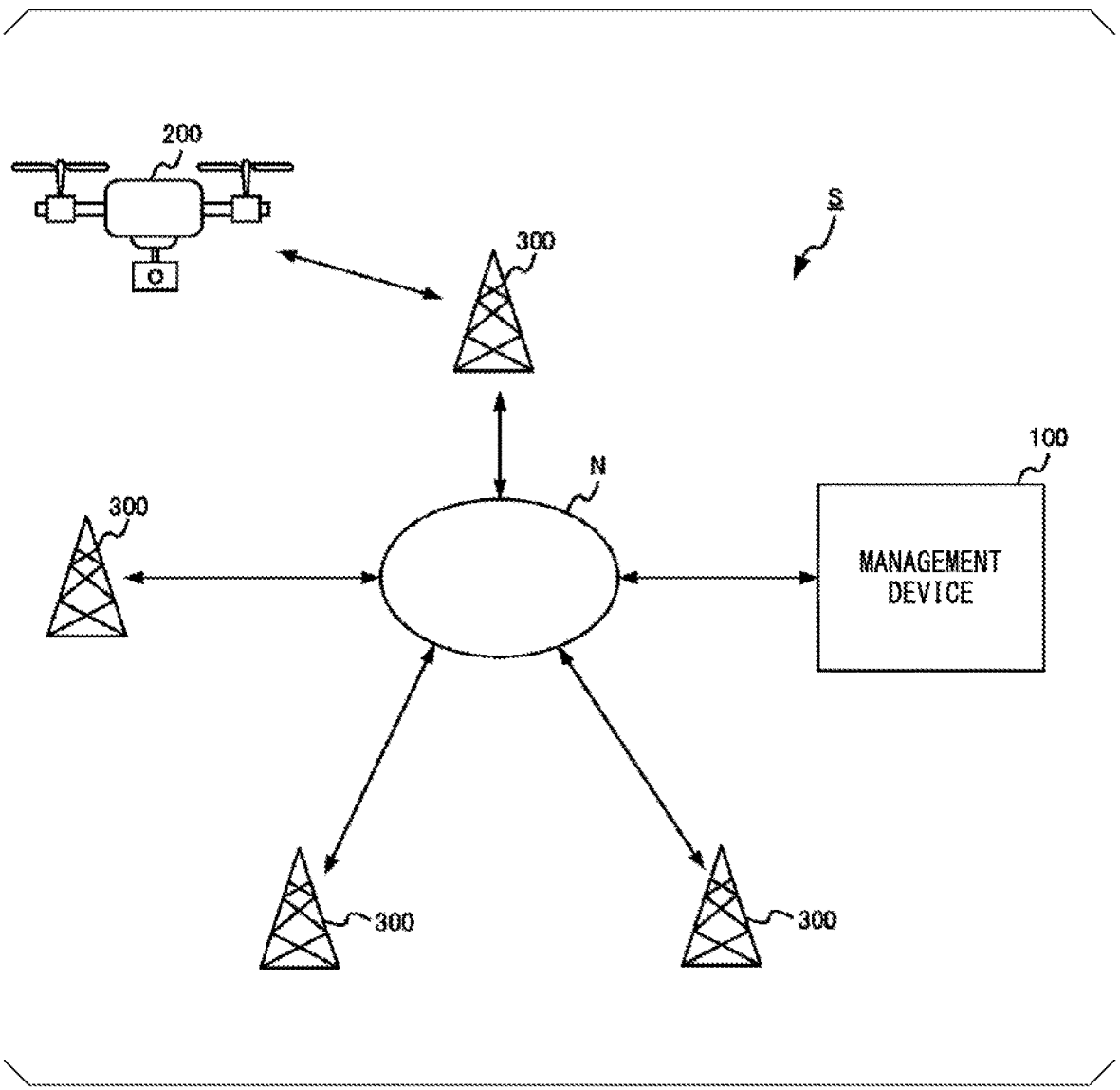
FIG. 1 is a schematic diagram showing the configuration of a flight management system according to the first embodiment of the present invention.

FIG. 1 is a schematic diagram showing the configuration of a flight management system S according to the present embodiment. The flight management system S includes a management device 100, a flight device 200, and a plurality of base stations 300. The management device 100 is configured to set a flight route for the flight device 200 to fly in the air. In addition, the management device 100 may communicate with the flight device 200 dining its flight via the base station 300 through a network N. The management device 100 may sequentially instruct a flight direction of the flight device 200 to fly according to its flight route. For example, the management device 100 may acquire the communication status of multiple base stations 300 every predetermined time so as to store the history information of the acquired communication status. For example, the predetermined time is one hour.

For example, the communication status may refer to a RSSI, a BLER, a packet loss, a throughput, a RTT, an intensity of interference with neighboring base stations or the number of concurrently-connected lines with base stations 300, a usage rate of a CPU (Central Processing Unit) of the base station 300, a usage rate of memory, a usage rate of bandwidths, and the like. The RSSI (Received Signal Strength Indicator) is a received signal strength of the base station 300 to receive radio signals transmitted by communication terminals. The BLER (Block Error Ratio) is a ratio of the number of erroneously-received blocks to the total number of blocks to be transmitted in a certain time interval of communication. The throughput represents an amount of transmittable data for each unit time in data transmission. The RTT (Round-Trip Time) represents a delay, i.e. a time needed for packets to reciprocate between two devices.

The management device 100 is configured to estimate an amount of radio resources which can be allocated to the flight device 200 via the base stations 300 at a flight-schedule time/date of the flight device 200 with reference to the history information representative of the communication status of multiple base stations 300. The amount of radio resources may represent the number of allocated resource elements which are used for two-dimensional scheduling in a time domain and a frequency domain and which are divided in a mesh-like manner for each predetermined unit of elements.

When a bandwidth is divided into twelve sections each having 15 kHz of frequency components, for example, resource elements are produced by further dividing those sections in a timewise direction using a minimum unit of 1 ms. In this connection, radio resources may be transmission power or bandwidths which can be allocated to the flight device 200. The management device 100 is configured to set a flight route such that an amount of allocatable radio resources of the flight device 200 will become larger than an amount of radio resources which are scheduled to be used for the flight device 200 to communicate with the base station 300.

The flight device 200 may move along the flight route set by the management device 100. For example, the flight device 200 is configured of a drone. For example, the flight device 200 may move in a flight direction sequentially instructed by the management device 100, but a user may operate an unillustrated operation terminal to sequentially instruct a flight direction along the flight route. For example, the operation terminal is configured of a smartphone.

[Configuration of Management Device 100]

Figure 2:
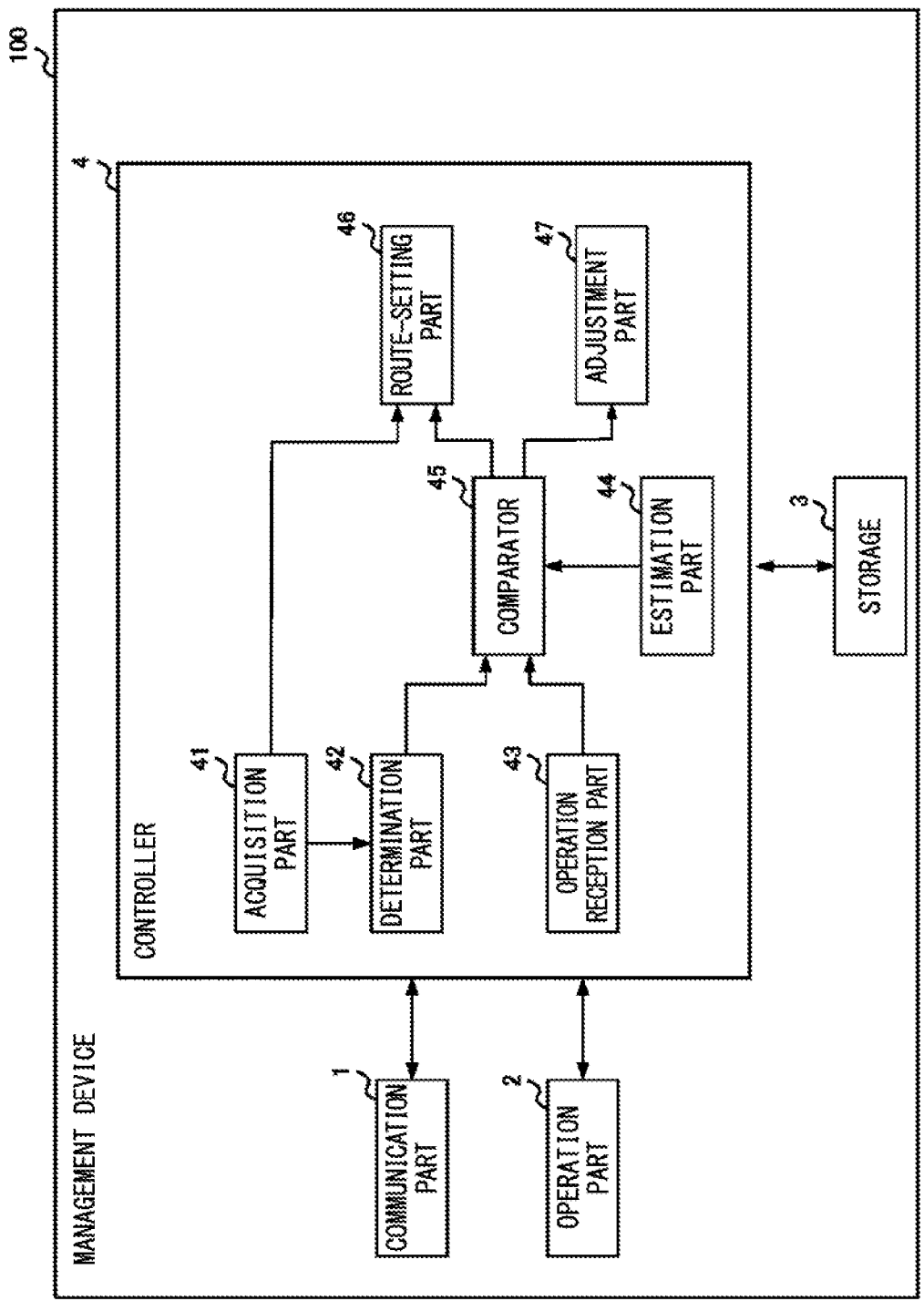
FIG. 2 is a block diagram showing the configuration of a management device according to the present embodiment.

FIG. 2 shows the configuration of the management device 100. The management device 100 includes a communication part 1, an operation part 2, a storage 3, and a controller 4. The communication part 1 is a communication interface used for communication via the base station(s) 300. The operation part 2 includes operation keys and a touch panel. The storage 3 is a storage media such as a ROM (Read-Only Memory) and a RAM (Random-Access Memory). The storage 3 stores programs to be executed by the controller 4.

For example, the controller 4 is configured of a CPU. The controller 4 realizes the functions of an acquisition part 41, a determination part 42, an operation reception part 43, an estimation part 44, a comparator 45, a route-setting part 46, and an adjustment part 47 by executing programs stored on the storage 3.

The acquisition part 41 is configured to acquire a flight-schedule time/date of the flight device 200, a flight-start position to start flight with the flight device 200, and a flight-end position serving as a flight destination of the flight device 200. For example, the acquisition part 41 is configured to acquire from an unillustrated external device the flight-schedule time/date of the flight device 200, the flight-start position and the flight-end position via the communication part 1. For example, the external device is a personal computer possessed by a user of the flight device 200.

In addition, the upper-limit count of flight devices 200 allowed to concurrently fly in each cell ascribed to a range of radio waves transmitted by the base station 300 has been determined in advance. For this reason, the acquisition part 41 may acquire the number of flight schedules of other flight devices, which are scheduled to fly in a cell covered by the base station 300 at the flight-schedule time/date with reference to the flight routes of other flight devices having their flight schedules stored on the storage 3. In addition, the acquisition part 41 is configured to acquire radio resources which are scheduled to be used for the flight device 200 to communicate with an external device via the communication part 1.

The acquisition part 41 is configured to acquire the communication status of the communication devices 300. The acquisition part 41 may acquire the communication status of multiple base stations 300 for each frequency band. As the communication status of the communication devices 300, for example, the acquisition part 41 may acquire the intensity of interference with neighboring base stations. A method of acquiring the intensity of interference with neighboring base stations, which is conducted by the acquisition part 41, will be described with reference to FIG. 3.

Figure 3:
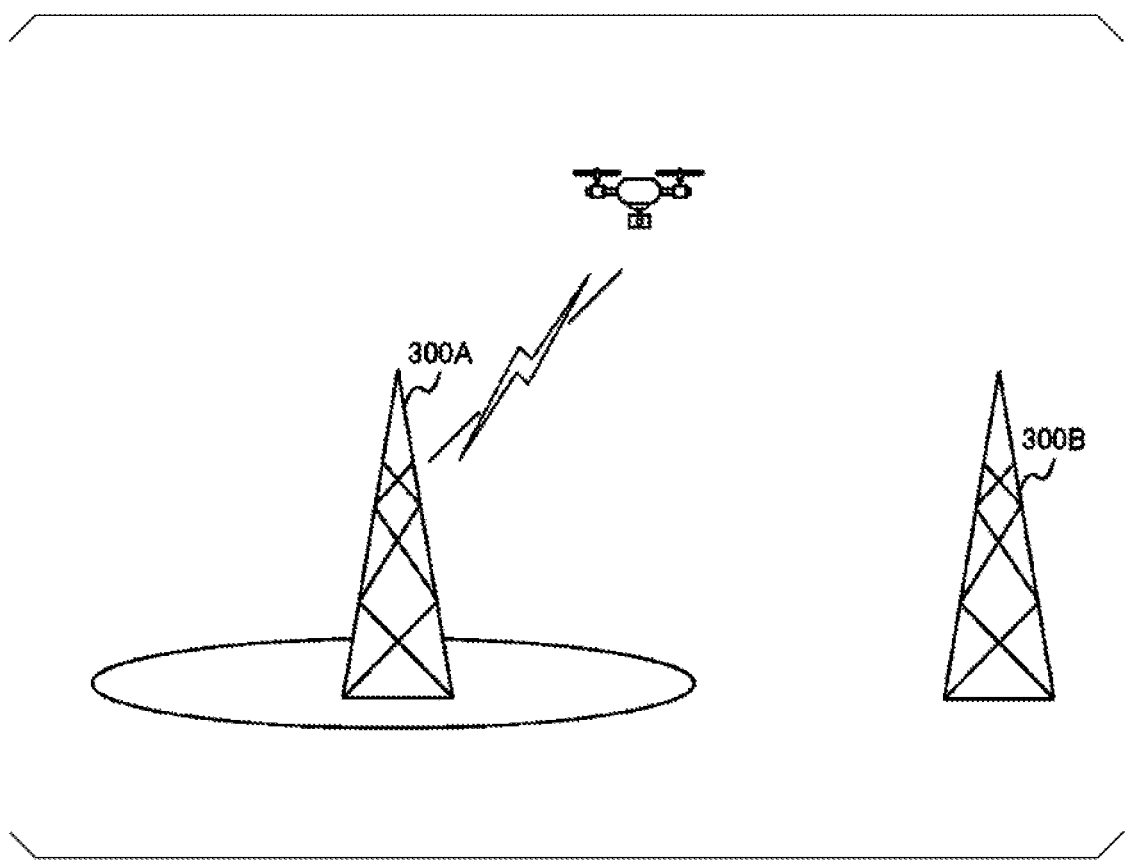
FIG. 3 is a schematic view showing interference by neighboring base stations with an acquisition part of the present embodiment.

FIG. 3 shows an elliptical zone representative of a cell (hereinafter, referred to as "a base-station cell" as well) covering communication with a base station 300A. In addition, another base station 300B adjoins the cell of the base station 300A. For example, the intensity of interference of the base station 300B for the cell of the base station 300A can be obtained by measuring signals coming from the base station 300B. When a flight device is flying up in the air in the cell of the base station 300A, the flight device can measure signals from the base station 300A and signals from the base station 300B, thus transmitting measurement results to the base station 300A every predetermined time. For example, the predetermined time is one minute. The base station 300A transmits the communication status including measurement results received from the flight device to the management device 100, in which the acquisition part 41 stores the history information representing the received communication status on the storage 3.

The acquisition part 41 is configured to compare the received signal strength of signals coming from the base station 300B, which is measured by the flight device in the cell of the base station 300A, with a threshold value. The threshold value is set to a prescribed value which can secure a safe flight of the flight device 200 without disconnecting communication between the base station 300 and the flight device 200 during its flight due to radio interference by a neighboring base station.

For example, the radio interference of the base station 300B becomes higher as the RSRP (Reference Signal Received Power), representing the received signal strength of signals coming from the base station 300B which is measured by the flight device in the cell of the base station 300A, becomes higher, which in turn indicates a higher risk of disconnected communication between the base station 300 and the flight device 200 during its flight due to radio interference. When the flight device measures the RSRP of −110 dBm in the cell of the base station 300A in comparison with the threshold value of −115 dBm, the acquisition part 41 determines that the received signal strength of signals coming from the base station 300B is higher than the threshold value (i.e. −100 dBm>−115 dBm). In this connection, the acquisition part 41 may use the RSRQ (Reference Signal Received Quality) as the measurement of the received signal strength of signals coming from the base station 300B in comparison with the threshold value.

The acquisition part 41 may acquire allocatable radio resources to the flight device 200 for respective one of multiple base stations 300 based on the communication status of multiple base stations 300 obtained during the flight of the flight device 200. With reference to the number of concurrently-connected lines with the base station 300 according to the communication status acquired by the acquisition part 41 during the flight of the flight device 200, for example, it is possible to produce allocatable radio resources to the flight device 200 by equally dividing radio resources provided by the base station 300 by the number of concurrently-connected lines with the base station 300. When the base station 300 can provide radio resources having a bandwidth of 1 Gbps while the base station 300 can provide five lines as the concurrently-connected lines, for example, it is possible to set allocatable radio resources to the flight device 200, i.e. 0.2 Gbps which is produced by equally dividing 1 Gbps by five.

The determination part 42 is configured to determine a plurality of base stations 300 based on the flight-start position and the flight-end position acquired by the acquisition part 41. For example, the determination part 42 may determine the base stations 300 each located at a position having the shortest distance within a predetermined distance with respect to the line segment connected between the flight-start position and the flight-end position. For example, the predetermined distance may range between 2 km and 20 km.

The operation reception part 43 is configured to receive a manager's operation input to the operation part 2. Various events such as a fireworks display may increase the usage rate of bandwidths of the base station 300 located around event venues. Alternatively, the maintenance of the base station 300 may temporarily decrease radio resources which the base station 300 can allocate to the flight device 200. For this reason, the operation reception part 43 is configured to receive an input operation input the previous time/date of events conducted in past and the scheduled time/date to conduct events which may increase the usage rate of bandwidths with respect to each base station 300. Similarly, the operation reception part 43 is configured to receive an input, operation to input the previous time/date of maintenance conducted in the past and the scheduled time/date to conduct maintenance which may decrease allocatable radio resources to the flight device 200 with respect to each base station 300. The operation reception part 43 stores the previous time/late of events or the like conducted in the past and the scheduled time/date to conduct events or the like on the storage 3.

The estimation part 44 is configured to estimate allocatable radio resources, which multiple base stations 300 can allocate to the flight device 200 at its flight-schedule time/date, based on the history information of the communication status of multiple base stations 300 determined by the determination part 47. For example, the estimation part 44 is configured to estimate allocatable radio resources to the flight device 200 using statistical values of communication status. Specifically, the estimation part 14 assumes an average value of usage rates of bandwidths in the last one month within the history information of communication status as a usage rage of bandwidths at the flight-schedule time/date and thereby determines the average value of usage rates of bandwidths, and then the estimation part 44 produces allocatable radio resources to the flight device 200 by calculating unused bandwidths from the average value of usage rates of bandwidths.

Usage rates of bandwidths for multiple base stations 300 tend to differ according to time zones and days of each week. For this reason, the estimation part 44 may produce allocatable radio resources to the flight device 200 at its flight-schedule time/date with reference to the history information of the communication status at the same time zone or the same day of a week as the flight-schedule time/day.

When some events or maintenances are going to be conducted at the flight-schedule time/date, the estimation part 44 may estimate allocatable radio resources, which respective one of multiple base stations 300 can allocate to the flight device 200 at its flight-schedule time/date, based on events to be conducted at the flight-schedule time/date or the history information of the communication status of multiple base stations 300 at the previous time/date having, conducted maintenance. For example, the estimation part 11 may estimate allocatable radio resources to the flight device 200 at its flight-schedule time/date based on the history information of the communication status at the same time as the previous time having conducted an event. Specifically, when the flight-schedule time/date is Aug. 25, 2017 at 20:42 during a period to conduct a fireworks display, the estimation part 44 may estimate allocatable radio resources to the flight device 200 at its flight-schedule time/date based on the communication status measured at the same time (i.e. 20:42) of the same day as the previous date having conducted a fireworks display.

The comparator 45 is configured to compare allocatable radio resources, which multiple base stations 300 can allocate to the flight device 200 and which are estimated by the estimation part 44, with necessary radio resources which are scheduled to be used for a communication of the flight device 200 and which are acquired by the acquisition part 41.

In addition, the comparator 45 is configured to acquire a usable frequency band, which can be used by the flight device 200 among multiple frequency bands receivable and transmittable with the base station 300, from an external device. The comparator 45 compares allocatable radio resources of the flight device 200 at its usable frequency band with necessary radio resources scheduled to be used for a communication of the flight device 200. When the base station 300 has receivable/transmittable frequency bands at 2.1 GHz and 1.8 GHz while the flight device 200 has a usable frequency band at 1.8 GHz, for example, the comparator 45 compares allocatable radio resources of the flight device 200 at the frequency band of 1.8 GHz with necessary radio resources scheduled to be used for a communication of the flight device 200. The comparator 45 is configured to notify comparison results to the route-setting part 46.

[Setting of Flight Route Based on Allocatable Radio Resources]

The route-setting part 46 is configured to set a flight route along which the flight device 200 is going to fly. For example, the route-setting part 46 is configured to set a flight route when the acquisition part 41 acquires a flight-start position, a flight-end position, and necessary radio resource scheduled to be used for a communication of the flight device 200 from an external device. The route-setting part 46 may set a flight route in a cell covered by the base station 300, which is selected from among multiple base stations 300 determined by the determination part 42 since the comparator 45 determines that allocatable radio resources of the base station 300 to be allocated to the flight device 200 are larger than necessary radio resources scheduled to be used for a communication of the flight device 200.

In addition, the route-setting part 46 may set a flight route in a cell covered by the base station 300, which is selected since the comparator 45 determines that allocatable radio resources of the base station 300 to be allocated to the flight device 200 at the usable frequency band of the flight device 200 are larger than necessary radio resources scheduled to be used for a communication of the flight device 200. For example, the route-setting part 46 may set a flight route in a cell covered by the base station 300, which is selected since the comparator 45 determines that allocatable radio resources of the base station 300 to be allocated to the flight device 200 at the frequency band of 1.8 GHz are larger than necessary radio resources scheduled to be used for a communication of the flight device 200.

[Setting of Flight Route Based on Flight-Schedule Count]

The route-setting part 46 may set a flight route over the cells, in which a flight-schedule count of flight devices including the flight device 200 does not reach the upper-limit count of concurrent flights, among all the cells covered by the base stations 300. Assuming that four flight devices are set to the upper-limit count of concurrent flights over the cells covered by the base station 300, for example, the route-setting part 46 may set a flight route over the cells each ascribed to three or less flight-schedule count of flight devices precluding the flight device 200.

In addition, the route-setting part 46 may set a flight schedule including the moving speed of the flight device 200 flying along its flight route. When the flight route of the flight device 200 is divided into a plurality of sections, for example, the route-setting part 46 may set a flight schedule of the flight device 200 by instructing the moving speed of the flight device 200 for each section such that the flight-schedule count will not exceed the upper-limit count of concurrent flights.

Moreover, the route-setting part 46 is configured to set and store the flight route of the flight device 200 on the storage 3. The route-setting part 46 should limit the flight routes of other flight devices over the cells of the base stations 300 attributed to the flight route of the flight device 200 without exceeding the upper-limit count of concurrent flights.

[Setting of Flight Route Based on Intensity of Interference]

The route-setting part 46 may set a flight route of the flight device 200 to fly in a cell covered by the base station 300 bearing the intensity of interference equal to or less than a threshold value in the communication status acquired by the acquisition part 41. The threshold value is set to an appropriate value which can secure a stable flight of the flight device 200 without disconnecting communication between the flight device 200 during its flight and the base station 300 due to radio interference by neighboring base stations.

Figure 4:
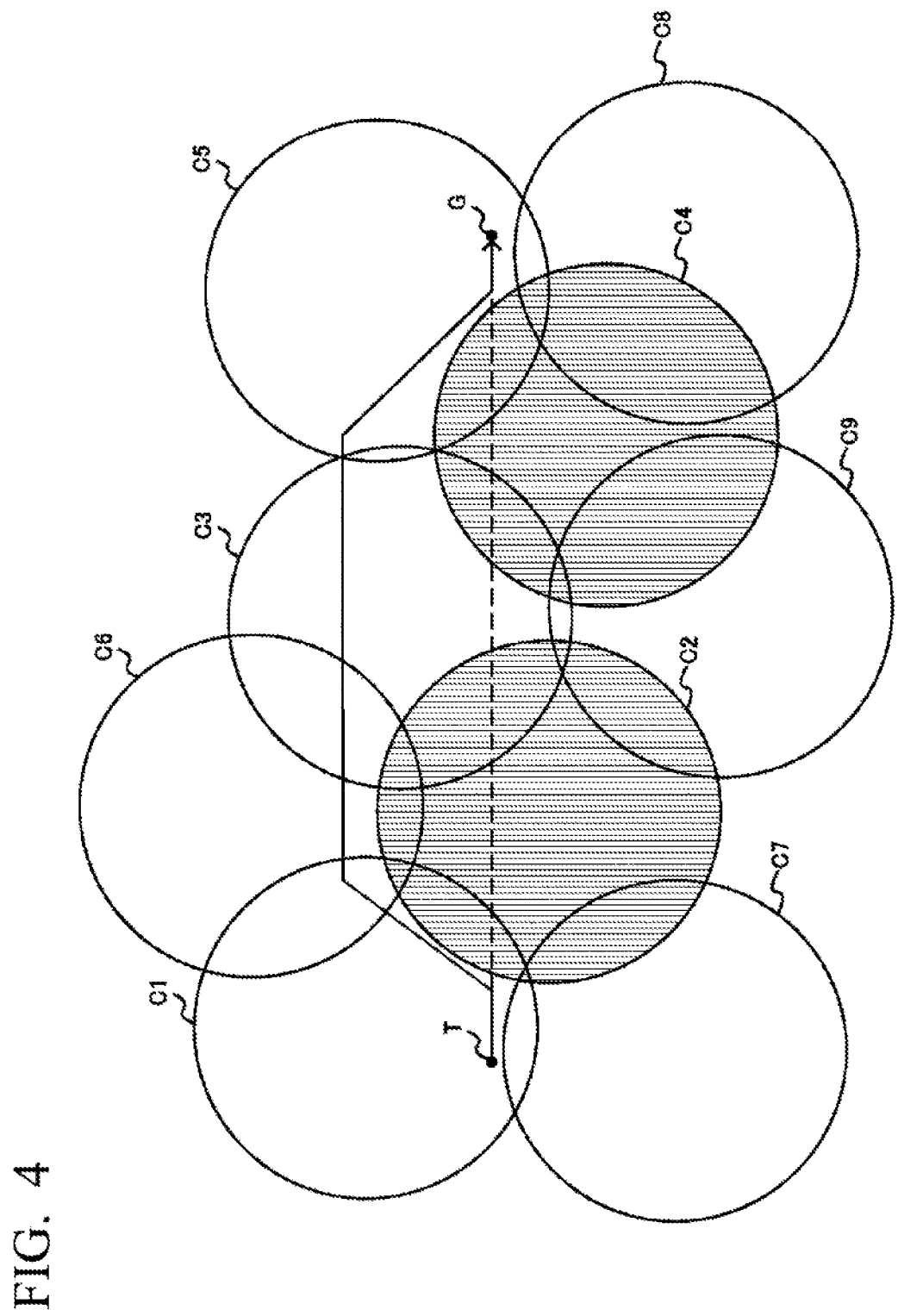
FIG. 4 is a schematic drawing showing an example of a method for setting a flight route according to the present embodiment.

An example of a flight-route setting method will be described with reference to FIG. 4. At first, the acquisition part 41 acquires a flight-start position T and a flight-end position G. Next, the determination part 42 determines cells C1 through C9 covered by the base stations 300 located at positions each having the shortest distance within a predetermined distance from a dotted line connected between the flight-start position T and the flight-end position G. The acquisition part 41 compares the intensity of interference according to the communication status of the cells C1 through C9 with the threshold value. FIG. 4 shows that the cells C1, C3, C5 through C9 indicate an intensity of interference by its neighboring cells equal to or less than the threshold value while the cells C2 and C4 illustrated by hatching indicate an intensity of interference by its neighboring cells greater than the threshold value.

The route-setting part 46 may set a flight route for the flight device 200 to fly in a cell covered by the base station in which an intensity of interference acquired by the acquisition part 41 is equal to or less than the threshold value. In the case of FIG. 4, the route-setting part 46 may set a flight route for the flight device 200 to fly through the cells C1, C6, C3, C5 each covered by the base station 300 in which an intensity of interference acquired by the acquisition part 41 is equal to or less than the threshold value while circumventing the cells C2 and C4 each covered by the base station 300 in which an intensity of interference acquired by the acquisition part 41 is greater than the threshold value.

[Resetting of Flight Route]

Returning to FIG. 2, it is likely that radio resources allocated to the flight device 200 in part of the cells covered by the base stations 300 located along the flight route will become smaller than necessary radio resources scheduled to be used for a communication of the flight device 200 due to a failure of the base station 300 along the flight route just before the flight device 200 starts to fly in the air. In this case, the route-setting part 46 may reset a flight route of the flight device 200 dining its flight.

At first, the route-setting part 46 reacquires allocatable radio resources to the flight device 200 according to the communication status of multiple base stations 300 which is acquired by the acquisition part 41 during the flight of the flight device 200. For example, the route-setting part 46 may acquire allocatable radio resources to the flight device 200 by equally dividing radio resources of the base station 300 by the number of lines concurrently connected to the base station 300 according to the communication status of multiple base stations 300 which is acquired by the acquisition part 41 dining the flight of the flight device 200. In addition, the route-setting part 46 may determine the base station 300 in which allocatable radio resources to the flight device 200 are larger than necessary radio resources scheduled to be used for a communication of the flight device 200. Thus, the route-setting part 46 will, reset the flight route of the flight device 200 to fly in the cell covered by the base station 300 determined above.

To secure allocatable radio resources to the flight device 200, the route-setting part 46 may change the frequency band allocated to the flight device 200 with another frequency band. In this case, the route-setting part 46 may reset the flight mute of the flight device 200 to fly in the cell covered by the base station 300 in which allocatable radio resources at the changed frequency band becomes larger than necessary radio resources scheduled to be used for a communication of the flight device 200.

The intensity of interference due to signals coming from neighboring base stations tend to become higher in the periphery of a cell of the base station 300 rather than the center of a cell of the base station 300. For this reason, the route-setting part 46 may set the flight route of the flight device 200 not to pass through the periphery of a cell of the base station 300 as safely as possible.

The adjustment part 47 is configured to adjust a direction of transmitting radio waves via antennas of the base station 300. When the acquisition part 41 acquires a higher intensity of inference in a cell of the base station 300 than the threshold value. For example, the adjustment part 47 may improve the received signal strength of the flight device 200 by changing a beam-transmission direction of antennas of the base station 300 with an upward direction. At this time, it is possible to improve communication quality of a communication conducted between the flight device 200 and the base station 300 since the received signal strength of the flight device 200 becomes relatively higher than the intensity of interference due to signals coming from neighboring base stations.

In addition, the adjustment part 47 may increase allocatable radio resources to the flight device 200 by prioritizing radio resources allocated to the flight device 200 rather than radio resources allocated to other users.

In disaster, for example, it is it avoidable that allocatable radio resources to the flight device 200 may become lower than necessary radio resources scheduled to be used for a communication of the flight device 200 irrespective of arbitrary setting of any flight routes due to the increasing number of lines concurrently connected to the base stations 300 which are located in a wire area. For this reason, the adjustment part 47 may increase radio resources allocated to the flight device 200 in a cell of the base station 300, in which allocatable radio resources to the flight device 200 are equal to or less than necessary radio resources scheduled to be used for a communication of the flight device 200, along the flight route of the flight device 200.

[Setting Procedure of Flight Route]

Figure 5:
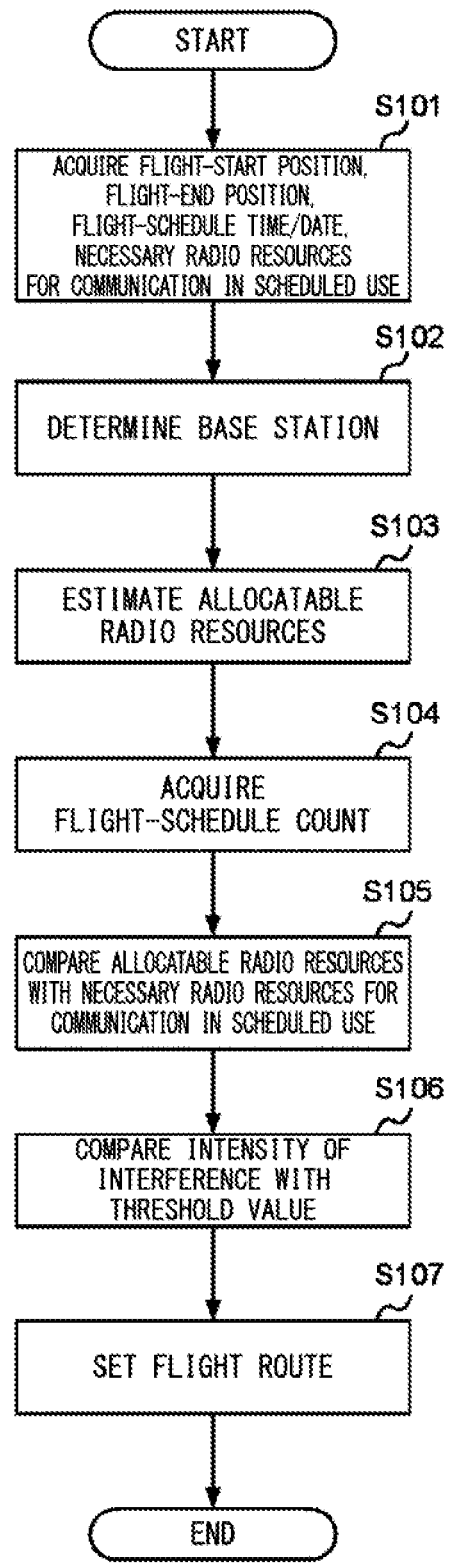
FIG. 5 is a flowchart showing the operation of the management device according to the present embodiment.

FIG. 5 is a flowchart showing the operation of the management device 100. The management device 100 starts to carry out the procedure of FIG. 5 when an external device transmits to the management device 100 a flight-start position, a flight-end position, and a flight schedule time/date of the flight device 200 as well as necessary radio resources scheduled to be used for a communication of the flight device 200.

At first, the acquisition part 41 acquires the flight-start position, the flight-end position, the flight schedule time/date, and necessary radio resources scheduled to be used for a communication of the flight device 200 via the communication part 1 (step S101). The determination part 42 determines the base stations 300 each located at a position having the shortest distance within a predetermined distance with respect to a line segment connected between the flight-start position and the flight-end position (step S102). The estimation part 44 estimates allocatable radio resources, which respective one of multiple base stations 300 can allocate to the flight device 200 at its flight-schedule time/date, based on the history information of the communication status of multiple base stations 300 determined by the determination part 42 (step S103).

In addition, the acquisition part 41 acquires the flight schedule count representative of the number of other flight devices which are scheduled to fly over the cell of the base station 300 at the flight-schedule time/date of the flight device 200 with reference to the flight routes described in flight plans of other flight devices stored on the storage 3 (step S104). The comparator 45 compares allocatable radio resources, which respective one of multiple base stations 300 estimated by the estimation part 44 can allocate to the flight device 200, with radio resources which the acquisition part 41 acquires as necessary radio resources scheduled to be used for a communication of the flight device 200 (step S105).

The route-setting part 46 compares the intensity of interference, which the acquisition part 41 acquires with respect to each of multiple base stations 300, with the threshold value (step S106). The route-setting part 46 sets a flight route along the cells covered by the base stations 300, each of which measures the intensity of interference acquired by the acquisition part 41 equal to or less than the threshold value and each of which can provide allocatable radio resources to the flight device 200 estimated by the estimation part 44 larger than necessary radio resources scheduled to be used for a communication of the flight device 200, and then the management device 100 exits the procedure (step S107).

[Effect of Present Invention]

According to the present embodiment, the route-setting part 46 is configured to set a flight route along the cells covered by the base stations 300 each of which can provide allocatable radio resources to the flight device 200 larger than necessary radio resources scheduled to be used for a communication of the flight device 200. For this reason, it is possible to inhibit a communication of the flight device 200 from being disconnected during the flight of the flight device 200 via the base station 300.

According to the present embodiment, the route-setting part 46 is configured to set a flight route over the cells, each of which is ascribed to the flight-schedule count of flight devices not reaching the upper-limit count of concurrent flights, among all the cells covered by the base stations 300. For this reason, it is possible for the route-setting part 46 to inhibit the flight device 200 from flying over the cells of the base stations 300 each ascribed to the flight-schedule count beyond the upper-limit count of concurrent flights.

According to the present embodiment, the adjustment part 47 is configured to adjust the direction of radio waves transmitted by antennas of the base station 300 covering its cell along the flight route of the flight device 200 with the intensity of interference acquired by the acquisition part 41 higher than the threshold value. By adjusting the direction of radio waves, it is possible for the adjustment part 47 to improve communication quality of a communication conducted between the flight device 200 and the base station 300. For this reason, it is possible for the adjustment part 47 to inhibit a reduction of the communication quality measured between the flight device 200 and the base station 300 due to interference of signals coming from neighboring base stations 300.

According to the present embodiment, the route-setting part 46 is configured to set a flight route over the cells covered by the base stations 300 with the intensity of interference estimated by the estimation part 44 equal to or less than the threshold value. For this reason, it is possible to inhibit a communication conducted between the base station 300 and the flight device 200 during its flight from being disconnected due to interference of signals coming from neighboring base stations 300.

According to the present embodiment, the route-setting part 46 is configured to reset the flight route of the flight device 200 over the cells covered by the base stations 300 with allocatable radio resources, which can be provided by multiple base stations 300 according to the communication status, larger than necessary radio resources scheduled to be used for a communication of the flight device 200. For this reason, it is possible for the route-setting part 46 to reset the flight route of the flight device 200 when the route-setting part 46 cannot secure radio resources allocated to the flight device 200 after setting the flight mute due to a failure of the base station(s) 300.

According to the present embodiment, the estimation part 44 is configured to estimate allocatable radio resources to the flight device 200 by respective one of multiple base stations 300 at the flight-schedule time/date of the flight device 200 based on some events to be conducted, at the flight-schedule time/date of the flight device 200 or the history information of the communication status of multiple base stations 300 at the previous time/date having conducted maintenance. For this reason, it is possible to inhibit a reduction of allocatable radio resources to the flight device 200 due to the increasing usage rate of bandwidths of the base station(s) 300 for events or due to the decreasing bandwidths of the base station(s) 300 for its maintenance.

According to the present embodiment, the route-setting part 46 is configured to set the flight route of the flight device 200 over the cells covered by the base stations 300, each of which can provide allocatable radio resources to the flight device 200 larger than necessary radio resources scheduled to be used for a communication of the flight device 200, when the acquisition part 41 acquires necessary radio resources scheduled to be used for a communication of the flight device 200. For this reason, it is possible to simplify a setting operation of setting a flight route.

In this connection, the present embodiment refers to air example of the management device 100 configured of a single server. However, the present invention is not necessarily limited to the present embodiment. For example, the management device 100 may be configured of a plurality of cloud-based servers. Specifically, the management device 100 includes a first management device and a second management device mutually connected together through a network, wherein the first management device may include the acquisition part 41, the determination part 42, and the estimation part 14 while the second management device may include the comparator 45 and the route-setting part 46 shown in FIG. 2. In this case, the first management device may further include a notification part configured to notify allocatable radio resources, which multiple base stations estimated by the estimation part 44 can allocate to the flight device 200, to the second management device.

Heretofore, the present invention has been described in conjunction with the foregoing, embodiment, whereas the technical scope of the invention is not necessarily limited to the scope of the foregoing embodiment; hence, it is possible to provide various modifications and variations within the subject matter of the invention. For example, concrete examples of decentralizing or integrating devices are not necessarily limited to the foregoing embodiment, and therefore the entirety or part of those devices can be functionally or physically decentralized or integrated in arbitrary units of configurations. In addition, the present invention may further include a new embodiment created by arbitrarily combining multiple examples. The new embodiment created by combining multiple examples may offer the same effect as the original embodiment.

REFERENCE SIGNS LIST 1 communication part
2 operation part
3 storage
4 controller
41 acquisition part
42 determination part
43 operation reception part
44 estimation part
45 comparator
46 route-setting part
47 adjustment part
100 management vice
200 flight device
300 base station
300A base station
300B base station
400 mobile communication device
G flight-end position
N network
S flight management system
T flight-start position

The invention claimed is:

1. A management device configured to instruct a flight direction for a flight device to fly according to a flight route based on a communication status for each base station in a plurality of base stations to communicate with the flight device, comprising a processor and a memory, the processor executing instructions stored on the memory, being configured to:
acquire a flight-schedule time/date, a flight-start position, and a flight-end position of the flight device;
determine the plurality of base stations covering a plurality of cells based on the flight-start position and the flight-end position;
statistically estimate allocatable radio resources corresponding to radio resources to be allocated to the flight device at the flight-schedule time/date by each base station among the plurality of base stations according to history information relating to the communication status of the plurality of base stations, wherein the radio resources represent a number of resource elements each defined as a prescribed frequency in a prescribed time;
compare allocatable radio resources with necessary radio resources to be used for a communication of the flight device with each base station among the plurality of base stations; and
set a flight route of the flight device over a cell covered by a base station which provides the allocatable radio resources to the flight device larger than the necessary radio resources to be used for the communication of the flight device.

2. The management device according to claim 1, wherein the processor is configured to assume an average value of a usage rate of bandwidths according to the history information so as to estimate the allocatable radio resources as unused bandwidths from the average value of the usage rate of bandwidths, and wherein the processor is configured to set the flight route of the flight device over the cell covered by the base station which provides the allocatable radio resources to the flight device at a usable frequency band of the flight device among a plurality of frequency bands larger than the necessary radio resources to be used for the communication of the flight device.

3. The management device according to claim 1, wherein the processor is configured to acquire a flight-schedule count representing the number of other flight devices scheduled to concurrently fly in the cell covered by the base station, and wherein the processor is configured to set the flight route over the cell covered by the base station ascribed to the flight-schedule count which does not reach an upper-limit count of concurrent flights.

4. The management device according to claim 1, wherein the processor is configured to
acquire an intensity of interference measured between a cell locating the flight device and its adjacent cell among the plurality of cells, and
adjust a direction of radio waves transmitted by an antenna of the base station towards the flight device when the intensity of interference acquired by the processor in the cell of the base station attributed to the flight route of the flight device is higher than a threshold value.

5. The management device according to claim 1, wherein the processor is configured to
acquire an intensity of interference occurring between adjacent base stations among the plurality of base stations, and
set the flight route to bypass a cell of a base station causing the intensity of interference above a threshold value.

6. The management device according to claim 1, wherein the processor is configured to
acquire the communication status of the plurality of base stations and to thereby acquire allocatable radio resources to the flight device with the plurality of base stations according to the communication status of the plurality of base stations, and
reset the flight route of the flight device over the cell covered by the base station which provides allocatable radio resources to the flight device according to the communication status of the plurality of base stations larger than necessary radio resources scheduled to be used for the communication of the flight device.

7. A flight management method configured to instruct a flight direction for a flight device to fly according to a flight route based on a communication status for each base station in a plurality of base stations to communicate with the flight device, comprising:
acquiring a flight-schedule time/date, a flight-start position, and a flight-end position of a flight device;
determining the plurality of base stations covering a plurality of cells based on the flight-start position and the flight-end position;
statistically estimating allocatable radio resources corresponding to radio resources to be allocated to the flight device at the flight-schedule time/date by each of the plurality of base stations according to history information relating to the communication status of the plurality of base stations, wherein the radio resources represent a number of resource elements each defined as a prescribed frequency in a prescribed time;

comparing the estimated allocatable radio resources with necessary radio resources to be used for a communication of the flight device with each base station among the plurality of base stations; and setting a flight route of the flight device over a cell covered by a base station which provides the allocatable radio resources to the flight device larger than the necessary radio resources to be used for the communication of the flight device.

\* \* \* \* \*